J. KAPLAN.
TWISTED BELT SAVING DEVICE.
APPLICATION FILED FEB. 19, 1915.
1,143,281.
Patented June 15, 1915.
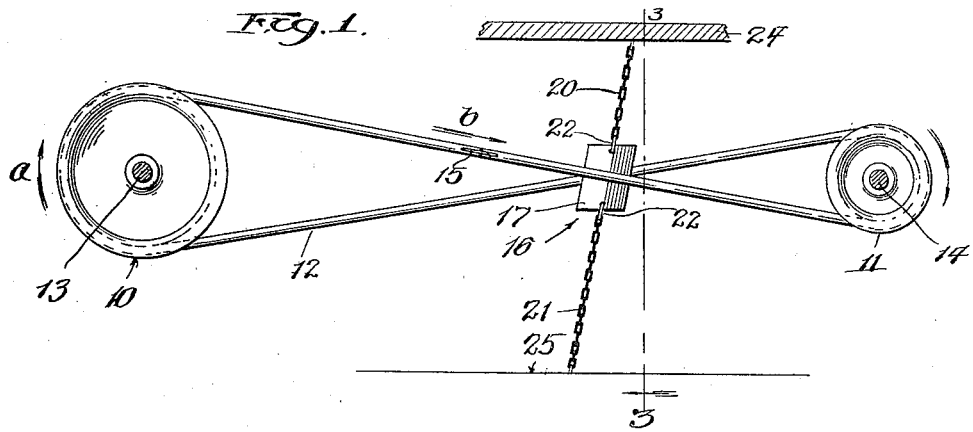
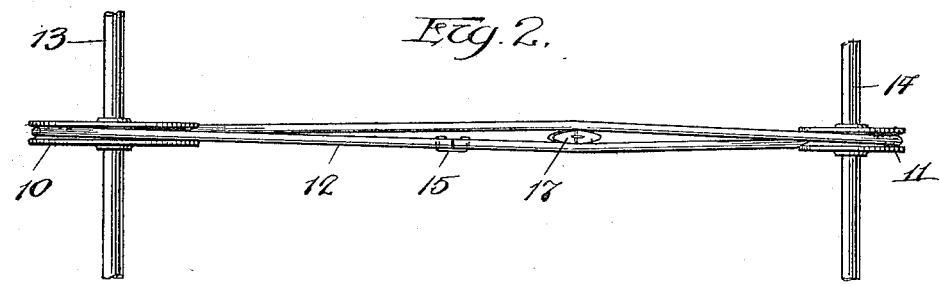
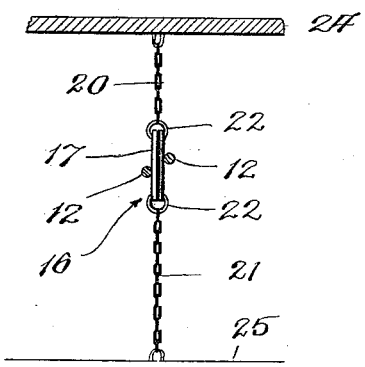
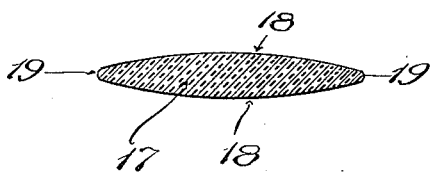
Witnesses:
Anna J Cohen
Louise Baumann
Inventor:
Jacob Kaplan,
by Charles O. Shurvey

UNITED STATES PATENT OFFICE.

JACOB KAPLAN, OF CHICAGO, ILLINOIS.

TWISTED-BELT-SAVING DEVICE.

1,143,281.  Specification of Letters Patent.  Patented June 15, 1915.

Application filed February 19, 1915. Serial No. 9,237.

*To all whom it may concern:*

Be it known that I, JACOB KAPLAN, a citizen of the United States, and a resident of Chicago, county of Cook, and State of Illinois, have invented certain new and useful Improvements in Twisted-Belt-Saving Devices, of which the following is declared to be a full, clear, and exact description.

This invention relates to devices for reducing wear on twisted belts and its object is to provide a simple and efficient means capable of being readily installed in place at the crossing point of twisted belts and arranged to automatically adjust itself to any side sway of the belt.

To such ends the invention consists in the novel features hereinafter fully set forth and claimed.

The invention is clearly illustrated in the accompanying drawing, in which:

Figure 1 is a side elevation of my improved belt saving device, showing the same in connection with a twisted belt and pulleys; Fig. 2 is a plan thereof; Fig. 3 is a vertical cross section taken on the line 3—3 of Fig. 1; and Fig. 4 is a detail, horizontal section through the anti-friction member of the device.

Referring to said drawing which shows the preferred embodiment of the invention, 10, 11, designates two grooved pulleys around which is trained a belt, 12, preferably round in cross section. The belt is arranged in the manner known to those skilled in the art, as a "twisted belt," that is to say, it is trained over the pulleys in such manner as to reverse the direction of rotation of the driven pulley from that of the driving pulley as clearly indicated by the arrows, *a, b, c*, in Fig. 1.

For convenience in illustrating the invention, the pulley, 10, may comprise the drive pulley and 11 the driven one. The driving pulley is mounted upon a drive shaft, 13, which receives its motion from any suitable source of power, and the driven pulley, 11, is mounted upon the driven shaft, 14, which may drive a sewing machine or other belt-driven apparatus. The ends of the belt are usually connected by a U-shaped hook, 15, the ends of which are forced through the end portions of the belt and bent back toward each other. It is a well-known fact that the belt rubs against itself at the place where it crosses itself, causing considerable wear, and more particularly the hook, 15, tears and unduly wears the belt, so that in a short time not only is the whole belt worn down, but at the place where the hook passes the other half of the belt, the belt wears through and becomes useless. At the present time, the cost of belts of this type has increased materially, and the saving thereof is of serious importance.

My improved belt saving device is shown at 16, and is located at the point where the two bights of the belt cross each other. In general it comprises an anti-friction member, 17, here shown in the form of a rhomboid or rectangle, and preferably composed of pottery, glass, porcelain, china, glazed earthenware, or like hard material having a smooth, polished surface. Its opposite faces, 18, 18, are convex or of cylindrical form, converging toward the edges, 19, where they merge into round edges or fairly sharp edges, although this exact cross section is not essential, but is preferable.

The anti-friction block is held in position by two flexible connections, 20, 21, such as chains, cables, wires or the like, secured to the block, as, for instance, by rings, 22, passed through holes near the upper and lower edges of the block. The top of the upper flexible connection, 20, is secured to a work-table, bench, or other support, 24, usually located above the belt, and the bottom of the lower, flexible connection, 21, is secured to the floor, 25, or other convenient device. The connecting mediums, 20, 21, are made taut enough to hold the block fairly steady between the two crossing parts of the belt, but it is obvious that enough play should be had to enable the block to sway back and forth in a sidewise direction to accommodate itself to the flexure or side sway of the belt in traveling between the pulleys.

In use the block is placed between the two bights of a twisted belt, at the crossing point thereof, and parallel with the pulleys, thus maintaining the crossing parts of the belt in spaced relation, free from rubbing contact with each other. By reason of the smooth surface of the block, across which the belt runs, the wear on the belt is minimized, and the possibility of the hook, 15, striking the belt at the crossing point or any other point is wholly eliminated. In this way the life of a twisted belt is increased manifold and the annoyance, loss of time, and cost of belts are reduced to a minimum.

I claim as new and desire to secure by Letters Patent:

1. A twisted belt saving device comprising a smooth-surface block, the faces of which taper toward the side edges, and located between the two bights of a twisted belt at its crossing point, and flexible connecting members secured to said block above and below the crossing point of said twisted belt and fastened to stationary objects above and below said belt, whereby said belt may run across the smooth faces of said block, and said block may accommodate itself to the play of the belt.

2. A twisted belt saving device comprising a smooth-surface block, having curved faces, and located between the bights of a twisted belt at the crossing point, and a flexible support for said block.

3. A twisted belt saving device comprising a smooth-faced block composed of hard material having a smooth, polished surface, and a flexible support therefor.

4. A twisted belt saving device comprising a block of hard material having a smooth polished surface and convex on two sides, said block being arranged to lie between the two bights of a twisted belt at its crossing point, and upper and lower flexible connections connected to the top and bottom of said block, and to upper and lower supports, substantially as and for the purpose specified.

JACOB KAPLAN.

Witnesses:
CHARLES O. SHERVEY,
ANNA J. COHAN.

Copies of this patent may be obtained for five cents each, by addressing the "Commissioner of Patents. Washington, D. C."